United States Patent [19]

Yoshida

[11] 4,238,703

[45] Dec. 9, 1980

[54] BRUSH DEVICE FOR A MINIATURE ELECTRIC MOTOR

[75] Inventor: Yuzuru Yoshida, Yamato, Japan

[73] Assignee: Aupac Kabushiki Kaisha, Yamato, Japan

[21] Appl. No.: 924,400

[22] Filed: Jul. 14, 1978

[51] Int. Cl.[3] .............................................. H02K 13/00

[52] U.S. Cl. ...................................... 310/242; 310/246

[58] Field of Search ............... 310/239, 232, 219, 241, 310/242, 244, 245, 246, 248-253, 40 MM

[56] References Cited

U.S. PATENT DOCUMENTS

| | | | |
|---|---|---|---|
| 2,358,958 | 9/1944 | Brown | 310/249 |
| 3,234,420 | 2/1966 | Linder | 310/248 |
| 3,296,473 | 1/1967 | Mabuchi | 310/239 |
| 3,482,132 | 12/1969 | Hurlin | 310/239 |
| 4,085,346 | 4/1978 | Yoshida | 310/40 MM |
| 4,088,912 | 5/1978 | Yoshida | 310/246 |
| 4,117,363 | 9/1978 | Honda | 310/219 |

*Primary Examiner*—R. Skudy

*Attorney, Agent, or Firm*—Polster, Polster and Lucchesi

[57] ABSTRACT

A brush device for a miniature electric motor of a type, wherein the commutator brush is inserted into a brush holding member made of a leaf spring which is generally bent in the form of a letter "L", one side of which is in a slightly bent form at about the middle portion thereof with a brush fitting portion being provided at the extreme end thereof, and the other side of which is rectilinear with a fitting portion to the main body of the motor being provided at the extreme end thereof. The brush fitting section has a pair of brush holding flaps which are mutually opposed along the lengthwise direction of the holder, and formed by inwardly bending from the flat surface part of the holder, a brush inserting guide section, and a slip-preventive member to prevent the brush from slipping out in the direction of its insertion; the slightly bent portion of the brush holder is provided with reinforcing means to hold the slightly bent portion in its original shape; and the brush per se has a head section to be inserted between the pair of flaps on the holder.

4 Claims, 15 Drawing Figures

BRUSH DEVICE FOR A MINIATURE ELECTRIC MOTOR

BACKGROUND OF THE INVENTION

This invention relates to a miniature electric motor, and, more particularly, it is concerned with a commutator brush device for a miniature electric motor.

At present, miniature electric motors are used widely in various electric and electronic apparatuses and appliances, hence demand for such miniature electric motors is great. With reduction in size of the elcetric and electronic apparatuses and appliances, the electric motor per se is required to be small in size. However, this increasing demand for miniaturization has not yet been completely fulfilled at present due, in particular, to the configuration of the brush holding member constituting a bar to such size-reduction.

SUMMARY OF THE INVENTION

In view of the abovementioned trend in the industry concerned, it is the primary object of the present invention to provide a highly miniaturized electric motor, in which an improvement is made in the configuration of the brush holding member for the commutator brush.

It is a secondary object of the present invention to provide a highly miniaturized electric motor, in which fitting of the commutator brush to the brush holding member can be done easily in a single fitting action, and the structure for the fitting is made strong.

It is a third object of the present invention to provide a highly miniaturized electric motor, in which the commutator brush can be smoothly fitted to the holder in automatizing the fitting work of the brush to the brush holding member, thereby improving productivity of the electric motor.

According to the present invention, briefly stated, there is provided a commutator brush device for a miniature electric motor comprising in combination: a brush holder made of a leaf spring bent in the general form of a letter "L", having a flat and smooth brush fitting part at one end part thereof, and a fitting part for the holder per se to the motor main body, and a brush to be held in said brush holder, said brush fitting section having a pair of brush holding flaps which are mutually opposed along the lengthwise direction of said holder, and formed by inwardly bending from the flat surface part of the holder, brush inserting guide section, and slip-preventive means to prevent the brush from slipping out in the direction of its insertion, the slightly bent portion of said brush holder being provided with reinforcing means to hold the slightly bent portion in its original shape, and said brush per se having a head section to be inserted between said pair of flaps on said holder.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent constructions so far as they do not depart from the spirit and scope of the present invention.

BRIEF DESCRIPTION OF THE ACCOMPANYING DRAWINGS

Specific embodiments of the present invention have been chosen for the purposes of illustration and description, and are shown in the accompanying drawings, forming a part of the specification, in which.

DETAILED DESCRIPTION OF PREFERRED EMBODIMENTS

In the following, detailed construction, function, and resulting effects of the brush device according to the present invention will be described in reference to preferred embodiments shown in the accompanying drawing.

Figure 1:
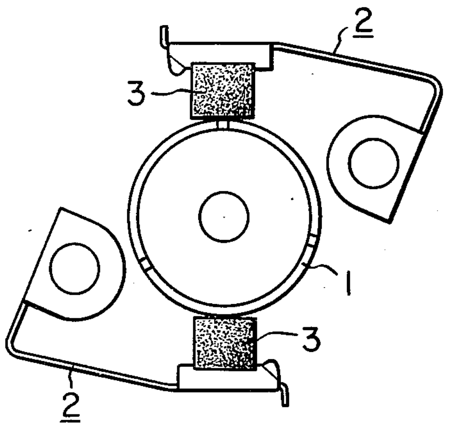
FIG. 1 is an explanatory diagram showing a positional relationship between a commutator and a brush.

FIG. 1 shows a positional relationship between the commutator and the brush device according to the present invention, in which a reference numeral 1 designates the commutator, 2 refers to the brush holder made of a leaf spring, and 3 refers to the commutator brush attached to the brush holder 2.

Figure 2:
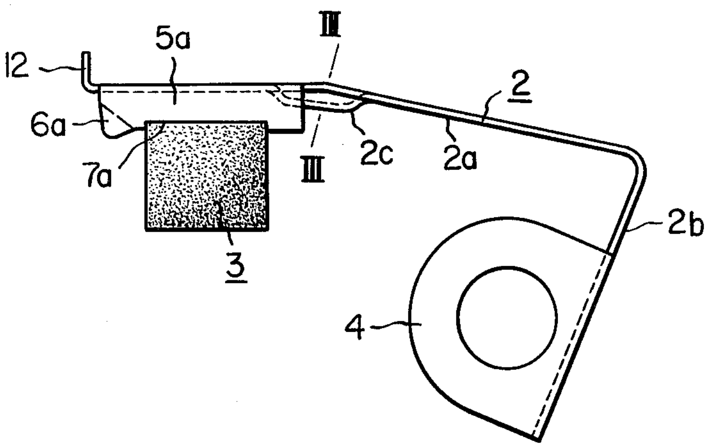
FIG. 2 is a front view of the brush device according to the present invention.

As shown in detail in FIG. 2, the brush holder 2 is in the shape of a letter "L" in its general configuration. One side 2*a* of the brush holder 2 is slightly bent at the middle portion thereof and is provided at the extreme end thereof with a brush fitting section, and the other side 2*b* thereof is in a straight-line, or rectilinear, form and a fitting tab 4 for the holder per se to be fitted to the motor main body is provided. The abovementioned brush fitting part includes a pair of brush holding flaps 5*a*, 5*a* mutually opposed along the longitudinal direction of the holder and folded inwardly of the flat surface portion, and a brush inserting guides 6*a*, 6*a* formed at the corner parts of the flaps 5*a*, 5*a* by bending the same outwardly. The flaps 5*a*, 5*a* have rectangular cut-out sections, or notches, 7*a*, 7*a* along the lengthwise direction thereof, which functions to prevent the brush from slipping out of the holder in its inserted direction.

Figure 3:
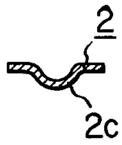
FIG. 3 is a cross-sectional view of a part of the brush device taken along the line III—III in FIG. 2.

A reinforcing expedient to maintain the shape of the slightly bent portion 2*a* of the brush holder is formed. In the illustrated example, a projection 2*c* is formed by stamping in the same direction as that of the slightly bent portion of the flap (FIG. 3).

Figure 4:
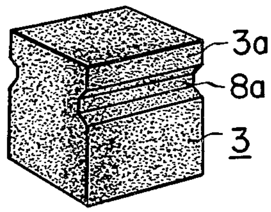
FIG. 4 is a perspective view of the brush for use in the present invention.

The brush 3 is usually made of graphite and is in such a configuration that it has a head section 3*a* to be inserted between both flaps 5*a*, 5*a* of the abovementioned brush holder 2, as shown in FIG. 4, and a contact section 3*b* to be contacted with the commutator. At both sides surfaces on the boundary between the head section 3*a* and the contact section 3*b*, there are formed V-shaped grooves 8*a*, 8*a*. The length of the side surface of the brush is equal to that of the notched parts 7*a*, 7*a* of the flaps 5*a*, 5*a*.

Figure 5:
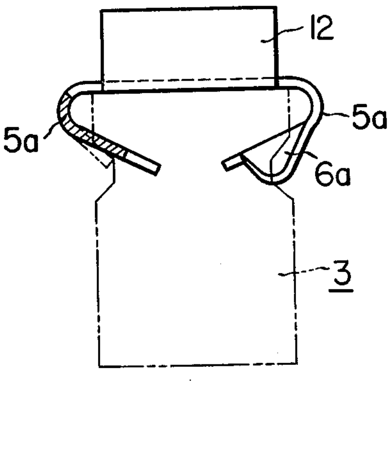
FIG. 5 is a side elevational view, partly cut away, of a guide section of the brush holder according to the present invention.
Figure 6:
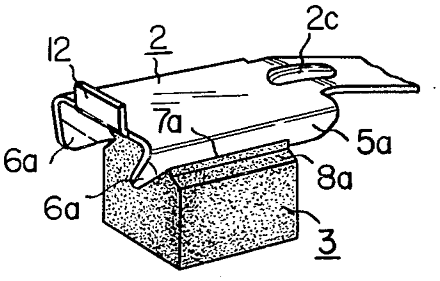
FIG. 6 is a perspective view showing a state of the brush being fitted to the brush holder.

The angle of bending of both flaps 5*a*, 5*a* to the flat surface part of the brush holder is taken smaller than the angle of inclination of the V-shaped grooves at the lower surface of the brush head (FIG. 5). On account of this, when the brush 3 is to be inserted into the flaps 5*a*, 5*a*, the guide sections 6*a*, 6*a* are made to contact with the V-shaped grooves 8*a*, 8*a* of the brush, and then the brush 3 is inserted thereinto, while expanding the flaps 5*a*, 5*a* sidewise. When the brush 3 fits into the notched portions 7*a*, 7*a* of both flaps 5*a*, 5*a*, the two sides of both notched portions 7*a*, 7*a* restitute by their own resiliency to be engaged with the front and rear end surfaces of the brush 3 to effect its slip-out prevention in the direction of insertion. Also, the top surface of the V-shaped groove of the brush 3 is pushed upward by the upper brims of the notched portions 7*a*, 7*a* of the flap, whereby the top surface of the brush closely contacts the bottom surface of the flat surface portion of the holder (FIG. 6).

Since the brush device according to the present invention is so constructured that the brush holder 2 is shaped in a letter "L" in its general form, and one side thereof to the brush fitting part is slightly bent inwardly at the middle portion thereof, the space to be occupied by the brush holder surrounding the commutator can be made small, which is effective in reducing the size of the motor as a whole. Further, since the reinforcing projection 2*c* is provided at the bent portion of the holder 2, this bent portion can retain its original shape as it is manufactured initially, even when the brush 3 is closely contacted to the commutator with the consequence that there arises no inconvenience in its use over a long period of time. Further, since the brush is rigidly attached to the holder 2 by the functions of the flaps 5*a*, 5*a* and the notched portions 7*a*, 7*a* thereof, there takes place no problem at all such as falling of the brush from the brush holder, insufficient electrical contact between the brush and commutator, and so forth.

Figure 7:
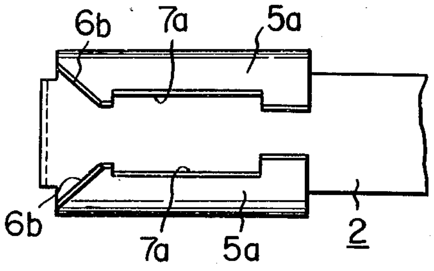
FIG. 7 is a bottom view showing a part of the brush holder formed on the inclined surface of the guide section.
Figure 8:
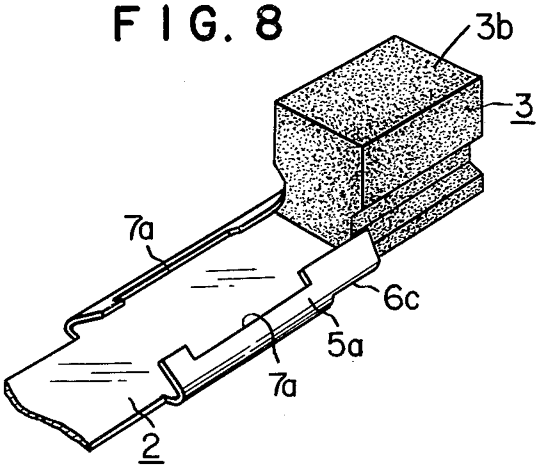
FIG. 8 is a perspective view showing a state of the brush being fitted to the brush holder, the guide section of which has been formed by notches.

FIG. 7 shows one example of forming the brush inserting guide sections 6*b*, 6*b* by obliquely cutting the corners of the flaps. FIG. 8 shows another example of forming the brush inserting guide sections 6*c*, 6*c* by making cuts at the boundary between the flaps 5*a*, 5*a* and the flat surface part of the brush holder. In either examples, no outward bending work is required as in the guide section 6*a*, hence it is meritorious in manufacturing the miniaturized electric motor.

Figure 9:
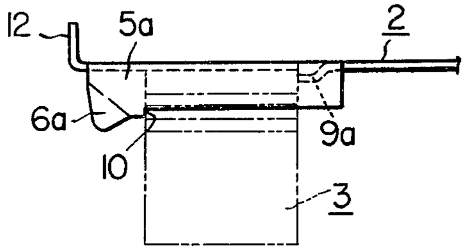
FIG. 9 is a front view of a part of a modified embodiment of a slip-preventive structure for the brush from the brush holder.

FIGS. 9 to 14 inclusive illustrate modified examples of the slip-preventive structure for the brush with respect to the direction of its insertion in the brush holder. The embodiment shown in FIG. 9 is in such a construction that a resilient pawl 9*a* is erectively provided at the forward or front end of the flat surface part of the brush holder in the inserting direction of the brush, and the flaps 5*a*, 5*a* are notched in a hook-shape to form a staged part 10. The front end surface of the brush 3 is held by the pawl 9*a*, while its rear end surface is held by the staged part 10.

Figure 10:
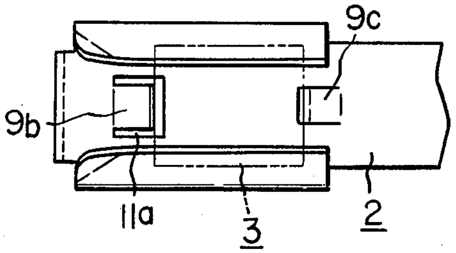
FIG. 10 is a bottom view of the modified embodiment shown in FIG. 9.
Figure 11:
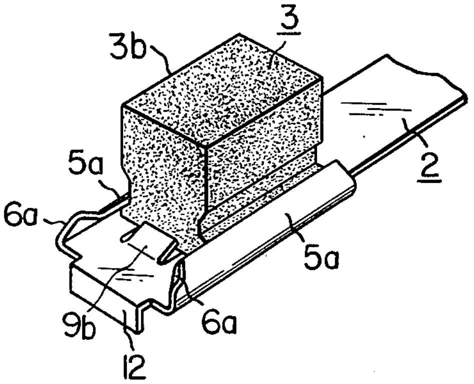
FIG. 11 is also a perspective view showing a state of fitting the brush to the brush holder in the modified embodiment of FIG. 9.

FIGS. 10 and 11 illustrate other embodiments, in which two pieces of resilient pawls 9*b*, 9*c* are cut and erected in the brush holder. The resilient pawl 9*b* at the front side of the brush inserting direction is pushed by the top surface of the brush at the time of its insertion, and falls down flush with the plane at the same level as the flat surface of the holder, and further pushes the brush against resiliency of the pawl 9*c* on the opposite side, and stands up by its own resiliency after the rear end surface of the brush has passed through the pawl 9*b*. In this case, mere erection of the pawl 9*b* from the flat surface part of the brush causes the pawl 9*b* which has fallen to be hooked on the inner peripheral edge of the hole 11*a* and makes it unable to erect thereafter.

In order therefore to solve this point of problem, the hole 11*a* to receive and accommodate therein such pawl is formed in a large size than that of the pawl 9*b* so that the pawl 9*b* may be erected and fallen smoothly at the time of insertion of the brush.

Figure 12:
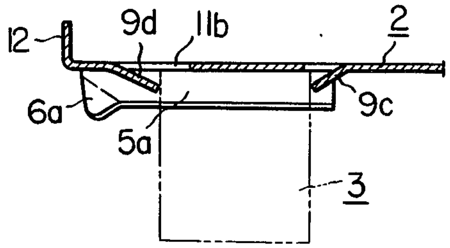
FIG. 12 is a side elevational view, partly in longitudinal cross-section, of still another modification of the slip-preventive structure for the brush fitted in the brush holder.
Figure 13:
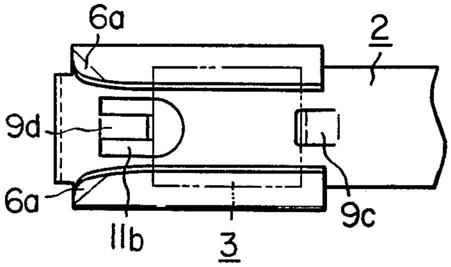
FIG. 13 is a bottom view of the modified embodiment shown in FIG 12.
Figure 14:
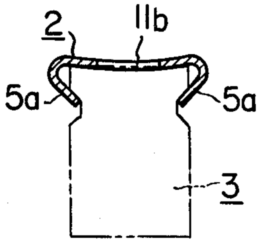
FIG. 14 is a cross-sectional view showing a modified embodiment of the brush holder according to the present invention.

FIGS. 12 to 14 illustrate still other embodiment of the brush holder, in which the receiving hole 11*b* of the pawl 9*d* at the front side of the holder in the direction of the brush insertion is formed in a tapered shape. When the receiving hole 11*b* becomes large in size, the flaps 5*a*, 5*a* on both sides of the brush holder is expanded at the time of the brush insertion as shown in FIG. 14. As the result of this, the flat surface part of the brush holder is flexed in an arcuate shape, and the head of the brush is apprehensively hooked on the edge of the receiving hole. Such inconvenience can be successfully eliminated by stamping out the receiving hole 11*b* in a tapered form. The receiving hole 11*b* may be in any appropriate shape such as circular, triangular, or semi-elliptic as shown in the drawing, and any other forms.

Figure 15:
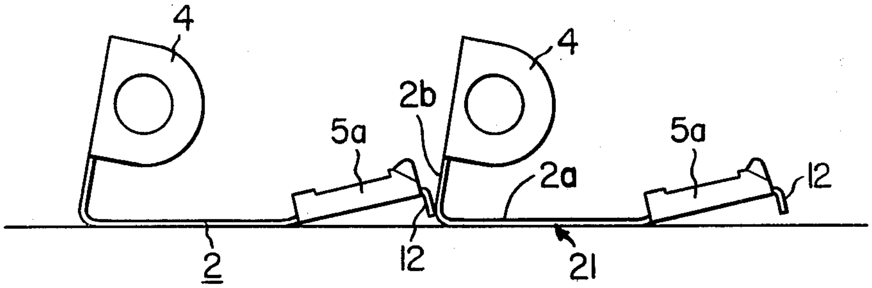
FIG. 15 is a front view showing arrangement of the brush holder.

FIG. 15 shows an arrangement of the brush holder when the brush fitting to the holder is to be carried out automatically. According to this arrangement as illustrated, the projection 12 is formed by bending the tip end of the holder to the opposite side to the flap, and the projection 12 is made to contact the bent portion of the rectilinear side 2*b* and the bent side 2*a* of the preceding brush holder 21, thereby sequentially arranging the holder. In such construction, the preceding brush holder can be pushed forward without failure by the subsequent holders, whereby a plurality of the holders are linearly transferred, and the inconvenience such that the adjacent holders are mutually overlapped can be prevented.

What is claimed is:

1. In a brush device for a miniature electric motor having:

a brush holder of a leaf spring in the form of a letter "L" in general configuration with a brush mounted on the end of one leg of said L-shaped brush holder in a flat brush fitting part including a pair of mutually opposed and inwardly bent brush holding flaps provided along the lengthwise direction of said leg;

a brush inserting guide at an end of each said flap; and slip-preventing means for said brush provided in the inserting direction of said brush, the improvement which comprises:

(a) the brush-mounting leg of said L-shaped brush holder being slightly bent to form an obtuse angle on the brush side of said leg, between the brush and the bend defining the legs of the L, and being provided with deformation preventive reinforcement member which is a longitudinally extending projection along the length of said leg through said slightly bent portion to maintain said slightly bent portion as it is; and (b) said slip-preventive means is composed of a pair of resilient projecting pawls in the flat surface part of said brush holder.

2. The improvement according to claim 1, wherein one of said resilient pawls collapses when said brush passes thereover, and wherein an opening larger in size than said resilient pawl is formed surrounding the same.

3. The improvement according to claim 2, wherein said opening which surrounds said resilient pawl is in a tapered shape toward the inserting direction of said brush.

4. In a brush device for a miniature electric motor having:

a brush holder of a leaf spring in the form of a letter "L" in general configuration and a brush mounted on the end of one leg of said L-shaped brush holder in a flat brush fitting part including a pair of mutually opposed and inwardly bent brush holding flaps provided along the lengthwise direction of said leg;

a brush inserting guide at an end of each said flap; and slip-preventing means for said brush provided in the inserting direction of said brush, the improvement which comprises:

(a) the brush-mounting leg of said L-shaped brush holder being slightly bent to form an obtuse angle on the brush side of said leg, between the brush and the bend defining the legs of the L, and being provided with deformation preventive reinforcement member which is a longitudinally extending projection along the length of said leg through said slightly bent portion to maintain said slightly bent portion as it is; and (b) said slip-preventive means comprising mutually opposed stop members defining a rectangular notch extending lengthwise in each of said flaps of said brush holder, the opposing two stop members becoming engaged with the front and rear end faces of said brush at its mounted position.

* * * * *